United States Patent
Chen et al.

(10) Patent No.: US 11,615,014 B2
(45) Date of Patent: Mar. 28, 2023

(54) USING RELOCATABLE DEBUGGING INFORMATION ENTRIES TO SAVE COMPILE TIME

(71) Applicant: International Business Machines Corporation, Armonk, NY (US)

(72) Inventors: Zheng Chen, Shanghai (CN); Jinsong Ji, Ponte Vedra, FL (US); Chaofan Qiu, Shanghai (CN); Xiong Hu Luo, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/388,753

(22) Filed: Jul. 29, 2021

(65) Prior Publication Data
US 2023/0034188 A1 Feb. 2, 2023

(51) Int. Cl.
*G06F 8/41* (2018.01)
*G06F 11/36* (2006.01)

(52) U.S. Cl.
CPC .......... *G06F 11/3624* (2013.01); *G06F 8/41* (2013.01)

(58) Field of Classification Search
CPC ............................. G06F 8/41; G06F 11/3624
USPC ....................................................... 717/140
See application file for complete search history.

(56) References Cited

U.S. PATENT DOCUMENTS

| | | | |
|---|---|---|---|
| 6,178,547 | B1 | 1/2001 | Pennello |
| 8,429,632 | B1 | 4/2013 | Coutant et al. |
| 8,458,681 | B1 * | 6/2013 | Coutant et al. ..... G06F 11/3624 717/151 |
| 9,176,848 | B2 | 11/2015 | Bates et al. |

(Continued)

OTHER PUBLICATIONS

Han, J., et al., "Reducing Parallelizing Compilation Time by Removing Redundant Analysis", In Proceedings of the 3rd International Workshop on Software Engineering for Parallel Systems, Nov. 1, 2016, 9 pp. (Year: 2016).*

(Continued)

*Primary Examiner* — Wei Y Zhen
*Assistant Examiner* — Mohammed N Huda
(74) *Attorney, Agent, or Firm* — Konrad Raynes Davda & Victor LLP; Janaki K. Davda

(57) ABSTRACT

Provided are techniques for using relocatable debugging information entries to save compile time when there are changes to source code. While compiling source code, for an unchanged function, a copy is made of a relocatable debugging information entries table and of a relocation information table. In addition, for a changed function, a new relocatable debugging information entries table and a new relocation information table are generated. The copy of the relocatable debugging information entries table and the new relocatable debugging information entries table are merged. The copy of the relocation information table and the new relocation information table are merged. The relocatable debugging information entries in the merged relocatable debugging information entries table are resolved according to information in the merged relocation information table to generate relocated Debugging with Attributed Record Formats information, which is stored in an object file that corresponds to the source code.

18 Claims, 11 Drawing Sheets

(56) References Cited

U.S. PATENT DOCUMENTS 9,195,567 B1    11/2015    Blackman et al.
2009/0178022 A1*    7/2009    Home et al. ........ G06F 11/3604
                                                                                            717/140

OTHER PUBLICATIONS

Altera Corporation, "Chapter 3: Quartus II Incremental Compilation for Hierarchical and Team-Based Design", Quartus II Handbook Version 13.1, vol. 1: Design and Synthesis, Nov. 2013, 64 pp.
Arm Keil, "Compiler User Guide: Minimizing Compilation Build Time", [online], [Retrieved on Apr. 19, 2021], Retrieved from the Internet at <URL: https://www.keil.com/support/man/docs/armcc/armcc_chr1359124200911.htm>, 2 pp.
Han, J., et al., "Reducing Parallelizing Compilation Time by Removing Redundant Analysis", In Proceedings of the 3rd International Workshop on Software Engineering for Parallel Systems, Nov. 1, 2016, 9 pp.

* cited by examiner

```
                                    ┌─ 200
┌─────────────────────────────────┐
│ struct Rel_DIE {                │
│ char* raw_info;                 │
│ char *DIE_name;                 │
│ unsigned Size;                  │
│ unsigned offset;                │
│ unsigned Parent_Index;          │
│ unsigned Sibling_Index;         │
│ };                              │
│                                 │
│ struct Rel_DIE *Rel_DIEs:       │
└─────────────────────────────────┘

┌─ 210
┌─────────────────────────────────┐
│ struct Rel_DIE_Rel_Info {       │
│ unsigned Rel_DIE_index;         │
│ unsigned raw information offset;│
│ unsigned Rel_DIE_dest;          │
│ };                              │
│                                 │
│ struct Rel_DIE_rel_info *Rel_Infos:│
└─────────────────────────────────┘
```

FIG. 2

```
<0><b>: Abbrev Number: 1 (DW_TAG_compile_unit)
    <c>    DW_AT_producer   : (indirect string, offset: 0x20): GNU C11 7.2.1.2017
ranch, based on subversion id 251096. -Aystem=linux -Aystem=unix -Aystem=posix
    <10>   DW_AT_language   : 12         (ANSI C99)
    <11>   DW_AT_name       : (indirect string, offset: 0xf5): foo.c
    <15>   DW_AT_comp_dir   : (indirect string, offset: 0x5): /home/czhengsz/tes
    <19>   DW_AT_low_pc     : 0x0
    <21>   DW_AT_high_pc    : 0x9c
    <29>   DW_AT_stmt_list  : 0x0
<1><2d>: Abbrev Number: 2 (DW_TAG_subprogram)
    <2e>   DW_AT_external   : 1
    <2e>   DW_AT_name       : (indirect string, offset: 0x0): foo1
    <32>   DW_AT_decl_file  : 1
    <33>   DW_AT_decl_line  : 5
    <34>   DW_AT_type       : <0x4a>
    <38>   DW_AT_low_pc     : 0x4c
    <40>   DW_AT_high_pc    : 0x50
    <48>   DW_AT_frame_base : 1 byte block: 9c         (DW_OP_call_frame_cfa)
    <4a>   DW_AT_GNU_all_tail_call_sites: 1
<1><4a>: Abbrev Number: 3 (DW_TAG_base_type)
    <4b>   DW_AT_byte_size  : 4
    <4c>   DW_AT_encoding   : 5         (signed)
    <4d>   DW_AT_name       : int
<1><51>: Abbrev Number: 4 (DW_TAG_subprogram)
    <52>   DW_AT_external   : 1
    <52>   DW_AT_name       : foo
    <56>   DW_AT_decl_file  : 1
    <57>   DW_AT_decl_line  : 1
    <58>   DW_AT_prototyped : 1
    <58>   DW_AT_type       : <0x4a>
    <5c>   DW_AT_low_pc     : 0x0
    <64>   DW_AT_high_pc    : 0x4c
    <6c>   DW_AT_frame_base : 1 byte block: 9c         (DW_OP_call_frame_cfa)
    <6e>   DW_AT_GNU_all_call_sites: 1
<2><6e>: Abbrev Number: 5 (DW_TAG_formal_parameter)
    <6f>   DW_AT_name       : i
    <71>   DW_AT_decl_file  : 1
    <72>   DW_AT_decl_line  : 1
    <73>   DW_AT_type       : <0x4a>
    <77>   DW_AT_location   : 2 byte block: 91 60      (DW_OP_fbreg: -32)
<2><7a>: Abbrev Number: 5 (DW_TAG_formal_parameter)
    <7b>   DW_AT_name       : j
    <7d>   DW_AT_decl_file  : 1
    <7e>   DW_AT_decl_line  : 1
    <7f>   DW_AT_type       : <0x4a>
    <83>   DW_AT_location   : 2 byte block: 91 64      (DW_OP_fbreg: -28)
<2><86>: Abbrev Number: 0
<1><87>: Abbrev Number: 0
```

FIG. 3

```
400
int foo()
{
    return 100;
}
```

```
410
<0><b>: Abbrev Number: 1 (DW_TAG_compile_unit)
    <c>     DW_AT_producer      : (indirect string, offset
stem=posix -msecure-plt -mtune=power8 -mcpu=power8
    <10>    DW_AT_language      : 12          (ANSI C99)
    <11>    DW_AT_name          : (indirect string, offset
    <15>    DW_AT_comp_dir      : (indirect string, offset
    <19>    DW_AT_low_pc        : 0x0
    <21>    DW_AT_high_pc       : 0x2c
    <29>    DW_AT_stmt_list     : 0x0
<1><2d>: Abbrev Number: 2 (DW_TAG_subprogram)
    <2e>    DW_AT_external      : 1
    <2e>    DW_AT_name          : foo
    <32>    DW_AT_decl_file     : 1
    <33>    DW_AT_decl_line     : 1
    <34>    DW_AT_type          : <0x4a>
    <38>    DW_AT_low_pc        : 0x0
    <40>    DW_AT_high_pc       : 0x2c
    <48>    DW_AT_frame_base    : 1 byte block: 9c
    <4a>    DW_AT_GNU_all_call_sites: 1
<1><4a>: Abbrev Number: 3 (DW_TAG_base_type)
    <4b>    DW_AT_byte_size     : 4
    <4c>    DW_AT_encoding      : 5           (signed)
    <4d>    DW_AT_name          : int
<1><51>: Abbrev Number: 0
```

FIG. 4

USING RELOCATABLE DEBUGGING INFORMATION ENTRIES TO SAVE COMPILE TIME

BACKGROUND

Embodiments of the invention relate to using Relocatable Debugging Information Entries (Rel-DIES) to save compile time when there are changes to source code.

Source code is compiled by a compiler into executable code, which may be executed to perform the functions of the source code.

Software developers debug the source code to eliminate program bugs and to trace unexpected behavior. It is popular in source code-level debugging to have compilers generate debug information that is the input of a debugger, which may help correct or improve the source code.

SUMMARY

In accordance with certain embodiments, a computer-implemented method is provided for using relocatable debugging information entries to save compile time when there are changes to source code. The computer-implemented method comprises operations. While compiling source code, for an unchanged function, a copy is made of a relocatable debugging information entries table and of a relocation information table. In addition, for a changed function, a new relocatable debugging information entries table and a new relocation information table are generated. The copy of the relocatable debugging information entries table and the new relocatable debugging information entries table are merged. The copy of the relocation information table and the new relocation information table are merged. The relocatable debugging information entries in the merged relocatable debugging information entries table are resolved according to information in the merged relocation information table to generate relocated Debugging with Attributed Record Formats information. The relocated Debugging with Attributed Record Formats information is stored in an object file that corresponds to the source code.

In accordance with other embodiments, a computer program product is provided for using relocatable debugging information entries to save compile time when there are changes to source code. The computer program product comprises a computer readable storage medium having program code embodied therewith, the program code executable by at least one processor to perform operations. While compiling source code, for an unchanged function, a copy is made of a relocatable debugging information entries table and of a relocation information table. In addition, for a changed function, a new relocatable debugging information entries table and a new relocation information table are generated. The copy of the relocatable debugging information entries table and the new relocatable debugging information entries table are merged. The copy of the relocation information table and the new relocation information table are merged. The relocatable debugging information entries in the merged relocatable debugging information entries table are resolved according to information in the merged relocation information table to generate relocated Debugging with Attributed Record Formats information. The relocated Debugging with Attributed Record Formats information is stored in an object file that corresponds to the source code.

In accordance with yet other embodiments, a computer system is provided for using relocatable debugging information entries to save compile time when there are changes to source code. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. While compiling source code, for an unchanged function, a copy is made of a relocatable debugging information entries table and of a relocation information table. In addition, for a changed function, a new relocatable debugging information entries table and a new relocation information table are generated. The copy of the relocatable debugging information entries table and the new relocatable debugging information entries table are merged. The copy of the relocation information table and the new relocation information table are merged. The relocatable debugging information entries in the merged relocatable debugging information entries table are resolved according to information in the merged relocation information table to generate relocated Debugging with Attributed Record Formats information. The relocated Debugging with Attributed Record Formats information is stored in an object file that corresponds to the source code.

BRIEF DESCRIPTION OF THE SEVERAL VIEWS OF THE DRAWINGS

Referring now to the drawings in which like reference numbers represent corresponding parts throughout:

FIG. 2 illustrates new data structures in accordance with certain embodiments.

FIG. 3 illustrates Debugging with Attributed Record Formats information in accordance with certain embodiments.

FIG. 4 illustrates an example function and Debugging with Attributed Record Formats information in accordance with certain embodiments.

DETAILED DESCRIPTION

Figure 1:
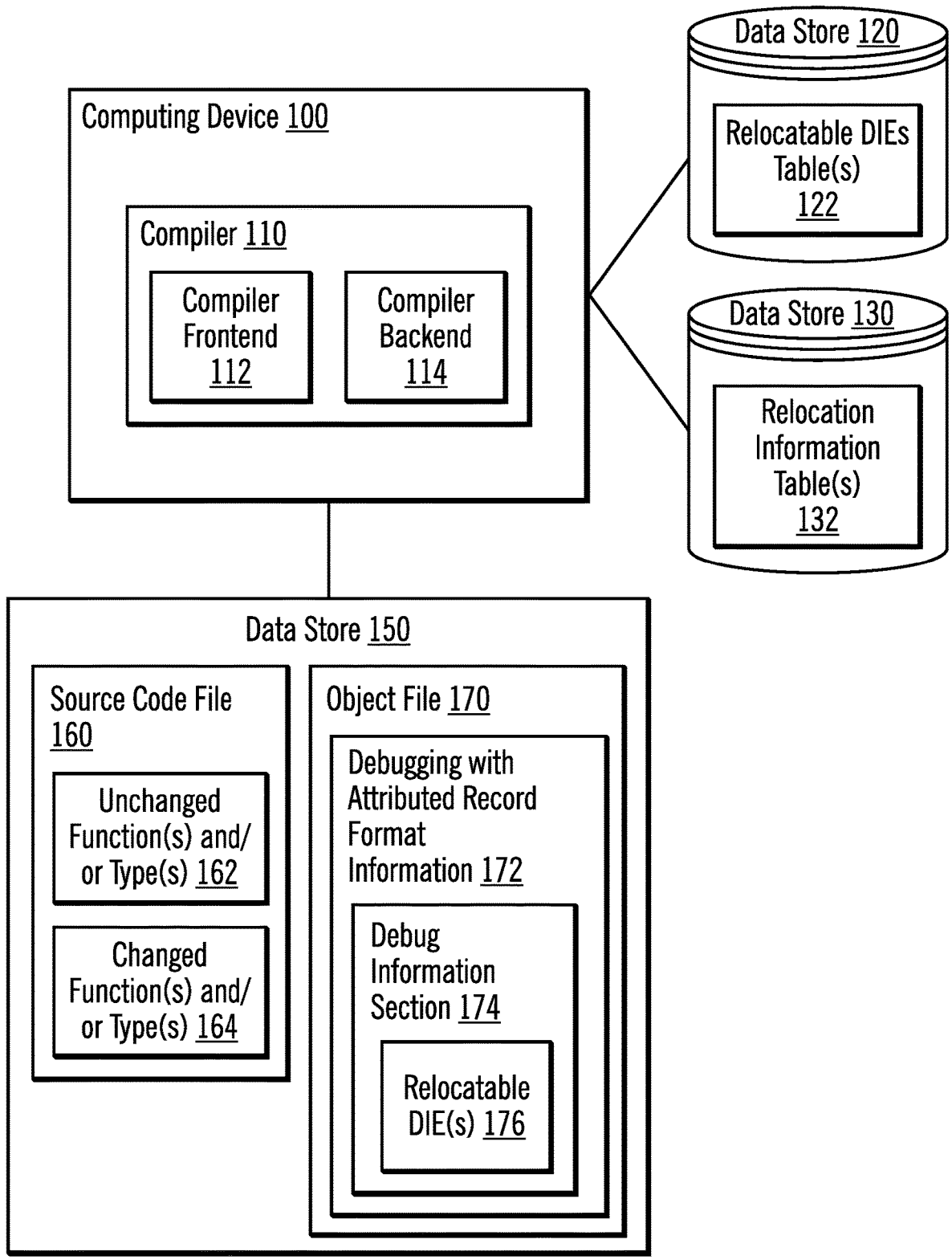
FIG. 1 illustrates, in a block diagram, a computing environment in accordance with certain embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Many compilers and debuggers use Debugging with Attributed Record Formats (also referred to with the acronym DWARF), which is a debugging file format to support source-level debugging. Debugging with Attributed Record Formats may be referred to as "debugging formats". Debugging with Attributed Record Formats is a format of debugging information within an object file. The Debugging with Attributed Record Formats description of a program is a tree structure in which each node may have a parent, children or siblings. Each of the nodes in the tree structure may represent types, variables or functions.

Debugging with Attributed Record Formats uses a series of Debugging Information Entries (DIEs) to define a representation of a source program. Each DIE consists of an identifying tag and a series of attributes. An entry or group of entries provide a description of a corresponding entity in the source program. The tag specifies the class to which an entry belongs, and the attributes define the specific characteristics of the entry.

Different Debugging with Attributed Record Formats sections make up the Debugging with Attributed Record Formats data. An example section is a debug information section (.debug_info section), which has a debug abbreviation section (.debug_abbrev section). The debug abbreviation section contains the abbreviation tables for the module units that are Debugging with Attributed Record Formats compiled. The abbreviations table for a single module unit may be a series of abbreviation declarations. Each abbreviation declaration specifies the tag and attributes for a particular debugging information entry. The appropriate entry in the abbreviations table guides the interpretation of the information contained directly in the debug information section. The debug information section contains the raw information regarding the symbols, types, functions, etc. Each module unit is associated with a particular abbreviation table, but multiple module units may share the same table.

Also, the DIE may be described as a data structure that represents language components (e.g., functions, variables, types, procedures, etc.) in debug files in Debugging with Attributed Record Formats. One DIE may be nested in a tree and may reference another DIE via an attribute.

Generating Debugging with Attributed Record Formats information may lead to more compile time for compilers. In some cases, a debug-build may take ten times more compile time than a release-build. A debug-build may be described as a compilation of source code that results in debug information in the compiled files without taking into account optimization of code execution, while a release-build may be described as compilation of the source code that results in optimizing the code execution. Even for a small change in source code, the compiler regenerates the Debugging with Attributed Record Formats info for a module unit (e.g., a file).

On the other hand, embodiments provide new data structures of relocatable DIEs (Rel-DIEs) and relocation information to reduce compile time for compilers. In certain embodiments, new operations are provided to set data in the relocatable DIEs, retrieve data from the relocatable DIEs, etc.

Embodiments enable the compiler to generate Debugging with Attributed Record Formats based on function and type changes by having the compiler generate relocatable DIEs, including raw Debugging with Attributed Record Formats information, instead of generating Debugging with Attributed Record Formats information directly into object files. With embodiments, the compiler generates raw Debugging with Attributed Record Formats information and relocatable DIEs for changed functions and changed types and copies previously generated (from a previous build of source code) relocatable DIEs of unchanged functions and unchanged types. The relocatable DIEs are DIEs that may be inserted at any offset of the debug information section. In certain embodiments, the relocation information is not copied over for unchanged functions and unchanged types.

FIG. 1 illustrates, in a block diagram, a computing environment in accordance with certain embodiments. A computing device 100 is coupled to a data store 120, a data store 130, and a data store 150. The computing device 100 includes a compiler 110. The compiler 110 includes a compiler frontend 112 and a compiler backend 114.

The data store 150 includes a source code file 160 and an object file 170. The compiler 110 compiles the source code file 160 to generate the corresponding object file 170. Although one source code file 160 and one object file 170 are illustrated, with embodiments, there may be any number of source code files and object files.

The source code file 160 includes one or more unchanged functions and/or types 162 and one or more changed functions and/or types 164. The object file 170 includes Debugging with Attributed Record Formats information 172, which includes a debug information section 174, which includes one or more relocatable DIEs (Rel_DIEs) 176.

The data store 120 stores one or more relocatable DIEs tables (Rel_DIEs tables) 122, while the data store 130 stores one or more relocation information tables (Rel_Infos tables) 132. The compiler 110 generates relocatable DIEs tables and relocation information tables for changed functions and types. For the unchanged functions and types, the compiler 110 obtains previously generated relocatable DIEs from the relocatable DIEs tables and previously generated relocation information from the relocation information tables. The compiler 110 resolves the relocations in the relocatable DIEs tables using the information in the relocation information tables and outputs the Debugging with Attributed Record Formats information into the final object file.

FIG. 2 illustrates new data structures 200, 210 in accordance with certain embodiments. FIG. 2 illustrates a relocatable DIE data structure 200 (struct Rel_DIE), which defines the structure of the relocatable DIE generated by the compiler 110. The Rel_DIE data structure includes raw Debugging with Attributed Record Formats information in a raw_info field, a relocatable DIE name in a DIE_name field, a size in a Size field, an offset in an offset field, a parent index in a Parent_Index field, and a sibling index in a Sibling Index field.

FIG. 2 also illustrates a relocation information data structure 210 (Rel_DIE_Rel_Info data structure), which defines the structure of the relocation information generated by the compiler 110. The Rel_DIE_Rel_Info data structure 210 includes a relocatable DIE index in a Rel_DIE_index field, a raw information offset in an offset field, and a relocatable DIE destination in a Rel_DIE_Dest field.

In certain embodiments, each instance of the Rel_DIE_Rel_Info data structure represents one relocation entry that the compiler 110 resolves after getting information for changed and unchanged functions and types.

For each instance of the Rel_DIE_Rel_Info data structure, the relocatable DIE index (Rel_DIE_Index) is an index for a source relocatable DIE into the relocatable DIEs table that has a relocation entry that is to be resolved. The raw information offset is the offset in the indexed, source relocatable DIE's raw information field (raw_info field). Since the compiler 110 copies (by retrieving) the raw information field of the relocatable die in the relocatable DIEs table, the compiler 110 has to resolve the relocation in the raw information field with the real offset after obtaining the raw information for the Rel_DIEs. The Rel_DIE_dest is the index for a target relocatable ion die into the relocatable DIEs table. The real offset for this target relocatable DIE is set (stored) at the raw information offset of the raw information of the source relocatable DIE.

In FIG. 2, for the struct Rel_DIE data structure 200, the parent index (Parent_Index) and the sibling index (Sibling_Index) keep track of the tree structure of the DIE information. The compiler 110 copies the data in the raw information field (raw_info field) for the DIEs to the object file. In addition, the compiler 110 resolves relocation entries in the raw information field (raw_info field) in order to reuse these fields.

In certain embodiments, the relocation entries are in the Rel_DIE raw_info field. The compiler 110 regenerates Debugging with Attributed Record Formats information for changed functions/types, without regenerating Debugging with Attributed Record Formats information for unchanged functions/types. Before obtaining the relocatable DIEs and the relocation information for the changed and unchanged functions and types, the compiler 110 puts a "placeholder" in the relocatable DIE raw_info field (of a source relocatable DIE), where the Debugging with Attributed Record Formats attribute points to another DIE (a target relocatable DIE). This is because the compiler 110 does not know the offset of the target relocatable DIE at this point. The compiler 110 records this "placeholder" as a relocation entry and stores this information in the relocation information table with a new entry. After the compiler 110 generates the Debugging with Attributed Record Formats information for the changed functions/types, the compiler 110 merges the relocatable DIEs for changed and unchanged functions/types, and, at this point, the compiler 110 knows the offset for each relocatable DIE because each relocatable DIE's size is recorded in the relocatable DIE size field. Then, the compiler 110 is able to replace the placeholder with the real offset of the target relocatable DIE within the raw information of the source relocatable DIE.

The relocation information field provides the information for the compiler 110 to resolve the relocatable fields in the raw information field.

FIG. 3 illustrates Debugging with Attributed Record Formats information 300 in accordance with certain embodiments. Because of the hard coded values in the debug information section, DIEs generated from a previous compilation of source code are not able to be reused. That is, the offset is an absolute value and becomes inaccurate if one of the DIEs is changed to be smaller or larger, so embodiments have provided a relocatable way to make the offsets relative. On the other hand, embodiments introduce relocatable DIEs (which may be described as new data structures) to allow reuse of debug information in compiling to save build time.

FIG. 4 illustrates an example function and Debugging with Attributed Record Formats information in accordance with certain embodiments. With reference to FIG. 4, function 400 has a DIE level reference and the Debugging with Attributed Record Formats information 410 is generated. In this example, the function foo returns type int, so it has a reference to an integer type, which is defined at offset 0x4a. If the function foo is changed, the Debugging with Attributed Record Formats information for the function foo will be changed, and the integer type definition at offset 0x4a is moved to some other offset. This is why the compiler 110 regenerates Debugging with Attributed Record Formats information for the functions/types in this module unit.

The following are examples of relocatable DIES based on the Rel_DIE data structure 200:

0: {raw0, "DW_TAG_compile_unit", 0x22, 0xb, −1, −1}
1: {raw1, "DW_TAG_subprogram_foo", 0x1d, 0x2d, 0, −1}
2: {raw2, "DW_TAG_type_int", 0x7, 0x4a, 0, −1}

For Rel_DIE 0, "raw0" is the reference to the raw Debugging with Attributed Record Formats information, "DW_TAG_compile_unit" is the DIE name, 0x22 is the unsigned size, 0xb is the offset, −1 is the parent index, and −1 is the sibling index.

For Rel_DIE 1, "raw1" is the reference to the raw Debugging with Attributed Record Formats information, "DW_TAG_subprogram_foo" is the DIE name, 0x1d is the unsigned size, 0x2d is the offset, 0 is the parent index, and −1 is the sibling index.

For Rel_DIE 2, "raw2" is the reference to the raw Debugging with Attributed Record Formats information, "DW_TAG_type_int" is the DIE name, 0x7 is the unsigned size, 0x4a is the offset, 0 is the parent index, and −1 is the sibling index.

In this example, there are three DIEs at respective offsets 0xb, 0x2d, 0x4a. Of these three DIEs, there is one DIE, DIE 1 (at offset 0x2d), which refers to another DIE, which uses attribute DW_AT_type. The compiler 110 uses the relocation entry to record this information. In FIG. 4, <34> is circled to highlight that this has a reference from one DIE to another DIE by absolute offset.

For this example, the Rel_Info is 0: {1, 0x7, 2} with the structure of the Rel_DIE_Rel_Info data structure 210. The 1 is the unsigned Rel_DIE index (identifying the source relocatable DIE), 0x7 is the unsigned raw information offset (into the raw information field of the source relocatable DIE), and 2 is the unsigned Rel_DIE_dest (identifying the target relocatable DIE).

For the Rel_Info 0: {1, 0x7, 2}, 1 means that DIE 1 has a relocation entry that is to be resolved. The 0x7 means the attribute offset in this DIE that is to be resolved is at offset 0x7, plus the base of DIE 1 (which is 0x7+0x2d=0x34), and this is where the DW_AT_type exists. The 2 means the DW_AT_type attribute points to DIE 2, which is the DW_TAG_base_type DIE for an integer type.

In certain embodiments, to resolve a relocation for Rel_Info: {Source DIE, Raw Information Offset, Target DIE}, where the source is a source relocatable DIE, and the target is a target relocatable DIE, the compiler 110 obtains an offset from the offset field in the target relocatable DIE. Then, the compiler 110 obtains the value (i.e., the raw Debugging with Attributed Record Formats information) of the raw information field in the source relocatable DIE. Next, the compiler 110 sets the value at the raw information offset of the raw information of the source relocatable DIE with the offset of the target relocatable DIE.

Figure 5:
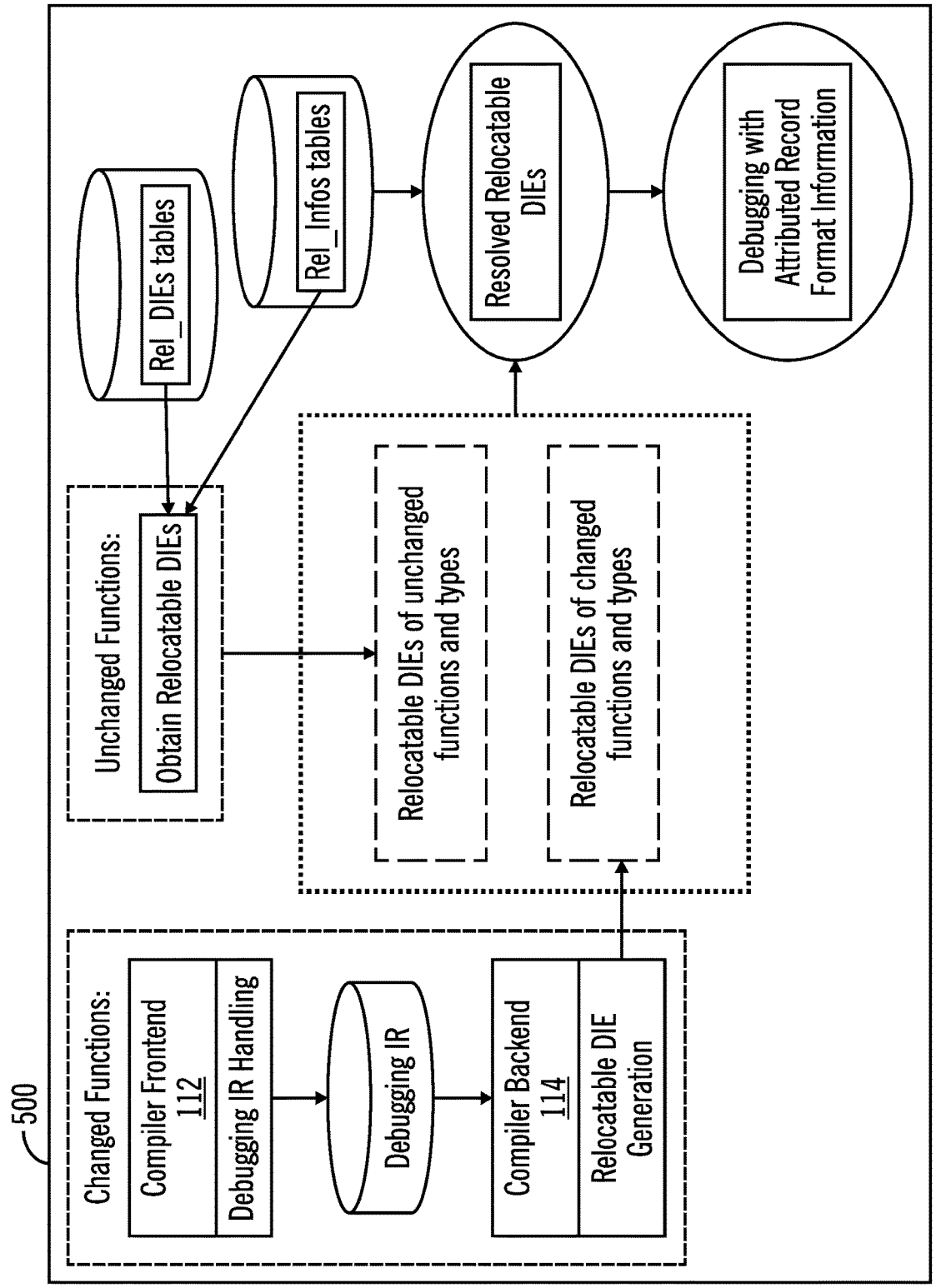
FIG. 5 illustrates a framework for processing unchanged functions and types and changed functions and types in accordance with certain embodiments.

FIG. 5 illustrates a framework 500 for processing unchanged functions and types and changed functions and types in accordance with certain embodiments. In FIG. 5, a compiler frontend 112 of the compiler 110 includes debugging Intermediate Representation (IR) handling. The compiler frontend 112 is connected to a data store with debugging IR, which is coupled to the compiler backend 114 of the compiler 110 that includes relocatable DIE generation. For relocatable DIE generation for unchanged functions and types, the compiler 110 copies the relocatable DIEs table for that unchanged function or type stored in the data store 120. The compiler 110 generates a new relocatable DIEs table and a new relocation information table for each changed function and each changed type. The relocatable DIES are resolved using the relocation information tables.

In certain embodiments, the first time there is a build for a source code with Debugging with Attributed Record Formats information, there is no incremental information from a previous build of that source code, and the compiler 110 treats all functions as changed functions.

Unlike normal Debugging with Attributed Record Formats generation, the compiler 110 first generates relocatable DIEs information that includes a relocatable DIEs table (Rel_DIEs) and a relocation information table (Rel_Infos). Based on these two tables, the compiler 110 resolves relocations in Rel_DIE::raw_info for Debugging with Attributed Record Formats generation.

In certain embodiments, for an incremental build, the compiler 110 generates Debugging with Attributed Record Formats information for changed functions (e.g., like building from scratch) by generating the two tables: a relocatable DIEs table and a relocation information table. For unchanged functions, the compiler 110 copies stored (e.g., from a previous build of the unchanged function) relocatable DIEs table and the relocation information table.

The compiler 110 merges relocatable DIEs tables and merges relocation information tables for the changed and unchanged functions. The compiler 110 also updates the information: Rel_DIE::offset, Rel_DIE::Parent_Index, Rel_DIE::Sibling_Index, Rel_DIE_Rel_Info::Rel_DIE_index, Rel_DIE_Rel_Info:Rel_DIE_dest. The compiler 110 resolves the relocations in Rel_DIE::raw_info according to the relocation information table.

Figure 6:
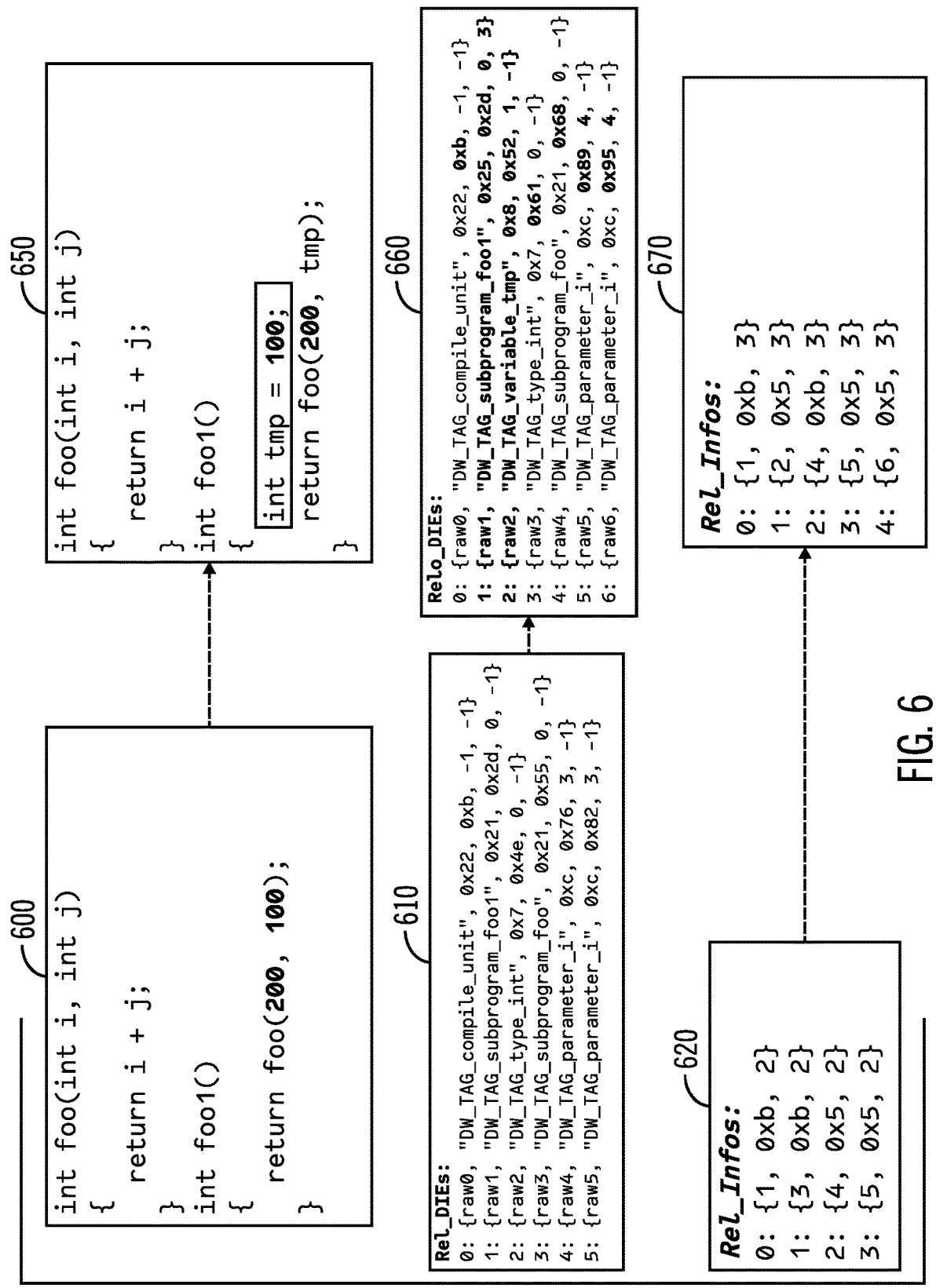
FIG. 6 illustrates an example of an unchanged function and a changed function in accordance with certain embodiments.

FIG. 6 illustrates an example of an unchanged function and a changed function in accordance with certain embodiments. For example, function int foo (int I, int j) has not changed, while function int fool( ) has changed to include "int tmp=100;". In FIG. 6, the source code 600 is the original source code before the source code is changed. The source code 600 has six relocatable DIEs in the relocatable DIEs (Rel_DIEs) table 610 and four relocations to be resolved as shown in the relocation information (Rel_Infos) table 620 to be resolved. In this example, each element of the Rel_Infos table is for the DW_AT_type attribute pointing to DW_TAG_base_type DIE for integer type. There are two functions with returning type integer, and there are two parameters for function foo which also have type integer.

In FIG. 6, the source code 650 is the changed source code in which a local variable is added to function fool. The compiler 110 does not need to regenerate Debugging with Attributed Record Formats information for DIEs 0, 2, 3, 4, and 5 from among the Rel_DIES 610 as they do not belong to the changed function fool. With embodiments, the compiler 110 regenerates Debugging with Attributed Record Formats info for DIE 1, which saves time and other resources.

For relocatable DIE 1, the compiler 110 first regenerates the relocatable DIEs (Rel_DIEs) table 660 and the relocation information (Rel_Infos) table 670 for the changed function fool. Now, there are two relocatable DIEs for function fool: one for local variable tmp and one for function fool. There is also one more reference between the relocatable DIEs, because local tmp is also type integer and is pointing to DW_TAG_base_type DIE with DW_AT_type attribute. The compiler 110 merges changed and unchanged functions/ types relocatable DIEs tables and relocation information tables, while allocating new indexes for the relocatable DIEs in the relocatable DIEs table, updating the offset, Parent_Index, and Sibling_Index in the relocatable DIEs table, and also updating the Rel_DIE_index and Rel_DIE_dest index in the relocation information table. Then, the compiler 110 resolves the "placeholder" in the raw information field in the relocatable DIEs table according to the relocation information table. After the "placeholders" are resolved (i.e., the references between DIEs have the correct offset), the compiler 110 emits new raw_info field to the final object file.

Figure 7A:
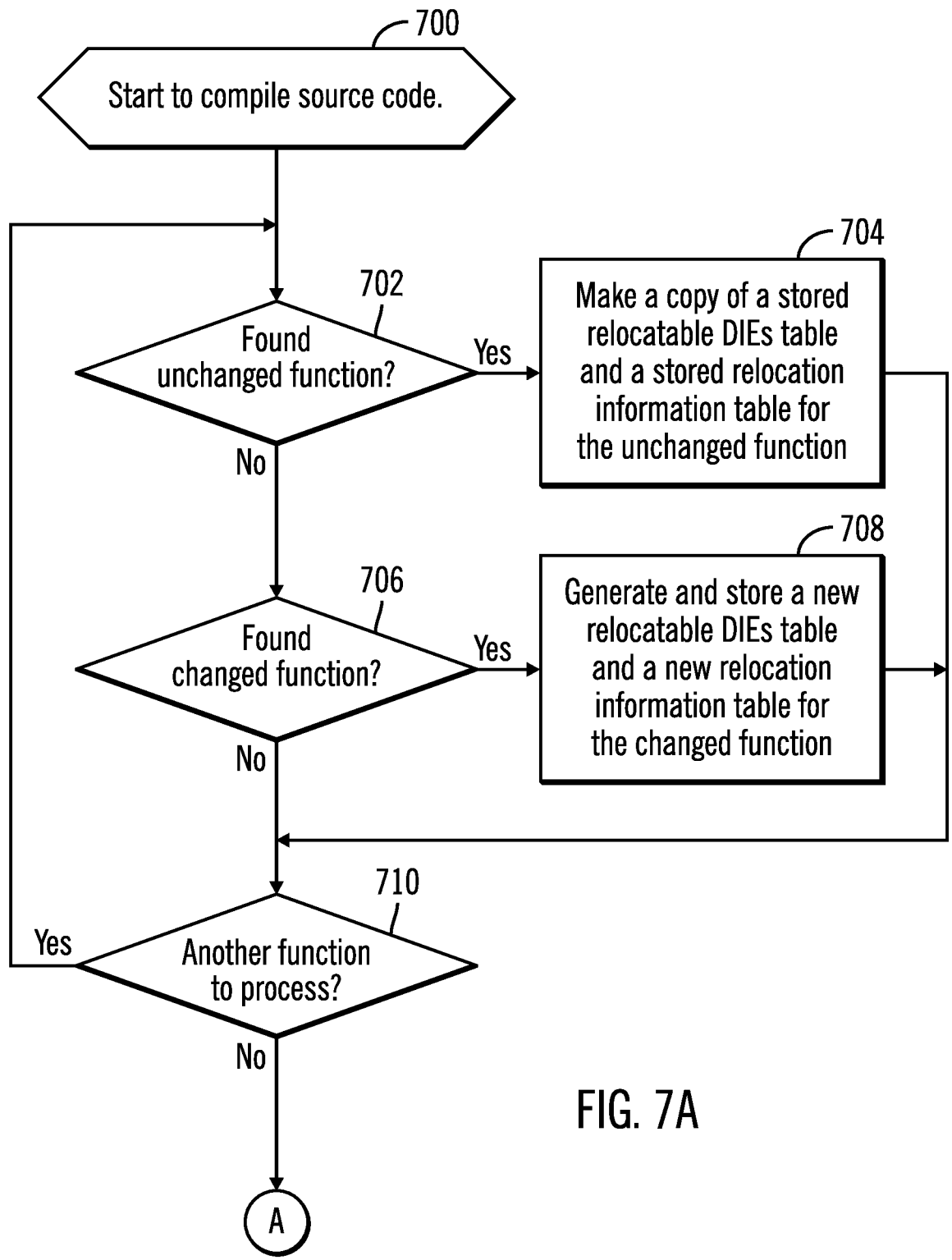
FIGS. 7A and 7B illustrate, in a flowchart, operations for processing changed and unchanged functions while compiling source code accordance with certain embodiments.
Figure 7B:
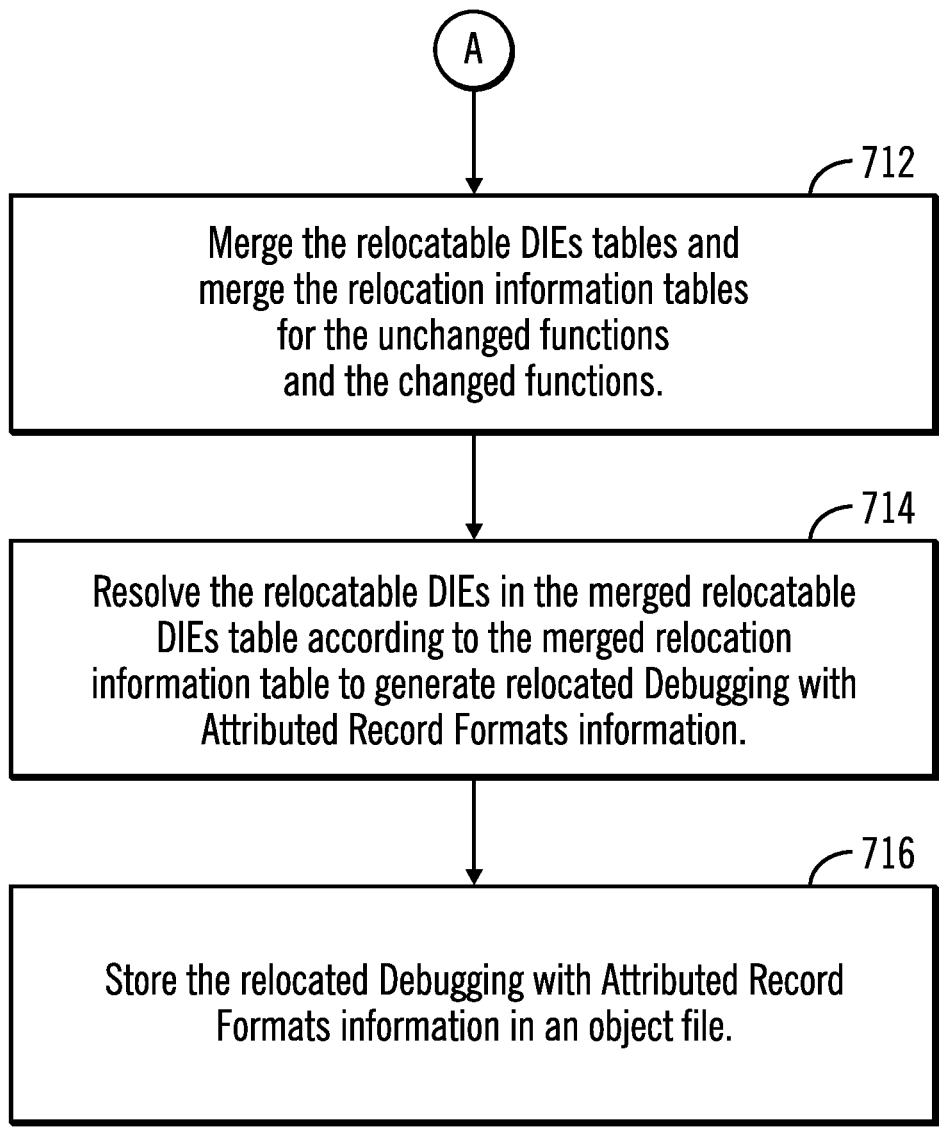

FIGS. 7A and 7B illustrate, in a flowchart, operations for processing changed and unchanged functions while compiling source code accordance with certain embodiments. Control begins at block 700 with the compiler 110 starting to compile source code. In block 702, the compiler 110 determines whether an unchanged function has been found. If so, processing continues to block 704, otherwise, processing continues to block 706. In block 704, the compiler 110 makes a copy of a stored relocatable DIEs table and a stored relocation information table for the unchanged function. For example, the compiler 110 copies previous build's relocatable DIEs table and relocation information table.

In block 706, the compiler 110 determines whether a changed function has been found. If so, processing continues to block 708, otherwise, processing continues to block 710. In block 708, the compiler 110 generates and stores a new relocatable DIEs table and a new relocation information table for the changed function. For example, the compiler 110 uses a legacy compiler's Debugging with Attributed Record Formats generation pipeline and generates the two tables: a relocatable DIEs table (including new raw_info) and a relocation information table.

In block 710, the compiler 110 determines whether there are more functions to process. If so, processing loops back to block 702 (FIG. 7A), otherwise, processing continues to block 712 (FIG. 7B).

In block 712, the compiler 110 merges the relocatable DIEs tables and merges the relocation information tables for the unchanged functions and the changed functions. In block 714, the compiler 110 resolves the relocatable DIEs in the merged relocatable DIEs table according to the merged relocation information table to generate relocated Debugging with Attributed Record Formats information. In block 716, the compiler 110 stores the relocated Debugging with Attributed Record Formats information in an object file. Then, the relocated Debugging with Attributed Record Formats information may be used to debug the source code.

In certain embodiments, the processing of FIGS. 7A and 7B is performed for changed types and unchanged types.

Figure 8:
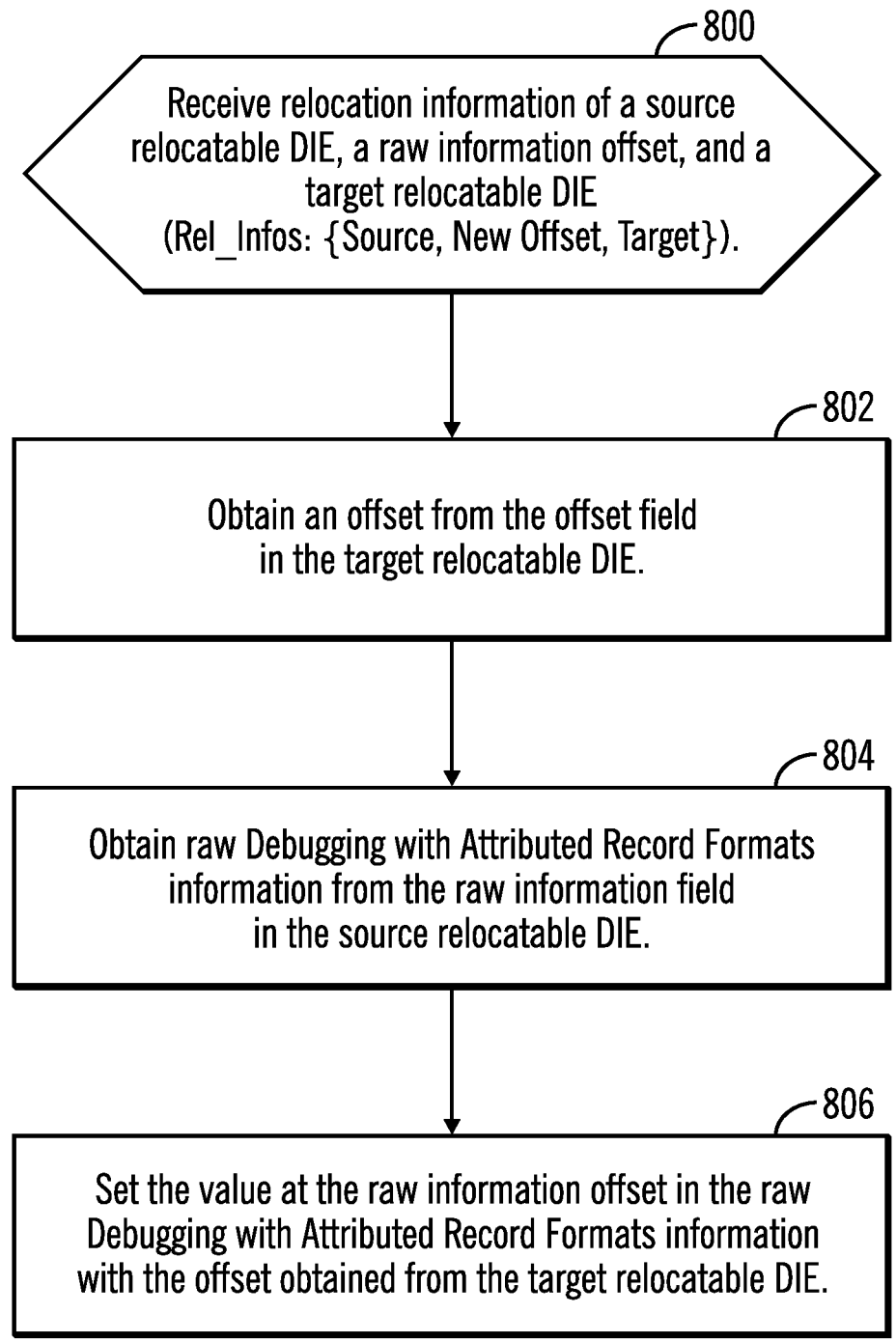
FIG. 8 illustrates, in a flowchart, operations for resolving a relocation in accordance with certain embodiments.

FIG. 8 illustrates, in a flowchart, operations for resolving a relocation in accordance with certain embodiments. Control begins at block 800 with the compiler 110 receives relocation information of a source relocatable DIE, a raw information offset, and a target relocatable DIE (i.e., Rel_Infos: {Source, New Offset, Target}). In block 802, the compiler 110 obtains an offset from the offset field in the target relocatable DIE. This is the real offset (correct location) of the target relocatable DIE. In block 804, the compiler 110 obtains raw Debugging with Attributed Record Formats information from the raw information field in the source relocatable DIE. In block 806, the compiler 110 sets the value at the raw information offset in the raw Debugging with Attributed Record Formats information with the offset obtained from the target relocatable DIE. This updates a placeholder in the raw Debugging with Attributed Record Formats information of the source relocatable DIE with the real offset of the target relocatable DIE. In certain embodiments, the operations of FIGS. 7 and 8 are performed by the compiler backend 114.

Figure 9:
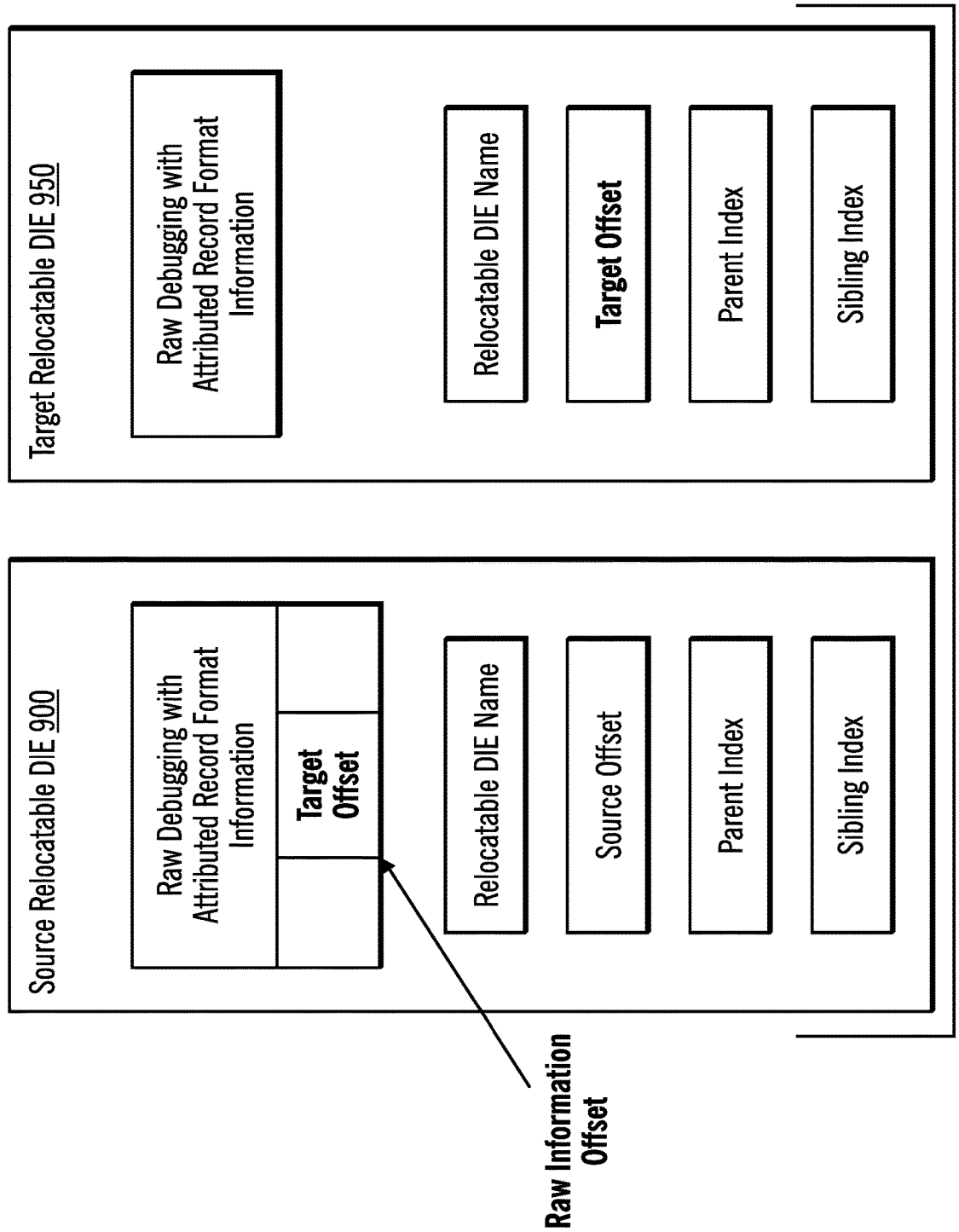
FIG. 9 illustrates, in a block diagram, elements for resolving a relocation in accordance with certain embodiments.

FIG. 9 illustrates, in a block diagram, elements for resolving a relocation in accordance with certain embodiments. As can be seen in FIG. 9, resolving a relocation stores (sets) a value of a target offset from a target relocatable DIE 950 into the raw Debugging with Attributed Record Formats information of the source relocatable DIE 900 at the raw information offset.

Embodiments save compile time because the compiler 110 just regenerates Debugging with Attributed Record Formats for changed functions. This is especially efficient for module units with many functions for which a few functions changed.

Although embodiments focus on Debugging with Attributed Record Formats the debug information section (.debug_info section) and the debug abbreviation section (.debug_abbrev section), embodiments are applicable to other sections (e.g., the debug line section (.debug_line) by using the same techniques described herein to make the other debug section relocatable.

Embodiments generate Debugging with Attributed Record Formats information at the function level, instead of at the file level. Embodiments use relocatable DIEs to make DIEs that may be inserted at any place of the debug information section. With embodiments, instead of generating raw Debugging with Attributed Record Formats information into object files directly, the compiler backend 114 generates two tables: a relocatable DIEs table and a relocation information table, and resolves the relocatable DIEs in the relocatable DIEs table according to the information in the relocation information table.

In certain embodiments, the compile time was tested using testcases. Initially, testcases containing large number of functions and symbols (e.g., 1000), in which debug information generation dominates the compile time. Then, the compile time of the whole testcase vs recompile time was compared after randomly changing one line in testcases. If the compile time difference is large, then embodiments are especially efficient. On the other hand, without the use of relocatable DIEs, based on FILE level compilation, no matter which single function was changed, the compile time was large as the large number of functions (e.g., 1000), were processed. However, with embodiments, based on function level, no matter which single function was changed, the compile time was small (e.g., 1 second).

In certain embodiments, the compile time was investigated by leveraging compiler options or instrumentation. The compile time difference root cause leveraging compile time options (e.g., -ftime-report/-ftime-trace) or instrumentation (e.g., flame graph) was examined. Embodiments were found to be efficient when the compile time improvement was due to less compile time spent in DIE generation.

In certain embodiments, compiler internals leveraging compiler options (e.g., save-temp) were investigated. The compiler temporary files were checked to see any debug DIE relocation auxiliary tables. Embodiments were found to be efficient when there were relocation auxiliary tables in DIE generation.

Thus, embodiments reuse previous DIEs for unchanged functions. Embodiments use relocatable-DIEs to skip re-generating DIE information for unchanged functions. Relocatable DIEs have extra information so that they may be inserted at any offset in the debug information section. Each time the source code is rebuilt, relocatable DIEs of unchanged functions are directly copied, and the compiler 110 generates relocatable DIEs for the changed functions.

With embodiments, one or a few functions in a source unit are typically changed. Thus, embodiments avoid compile time to re-generate debug information for unchanged functions.

Embodiments extend Debugging with Attributed Record Formats information to support compilation time reuse.

Thus, embodiments compile source code more efficiently using the relocatable DIEs to generate object code. In certain embodiments, the object code may be executed by the computing device 100 to perform the operations of the source code. In certain embodiments, the debugging information (Debugging with Attributed Record Formats information) stored in the object file is used to debug the source code.

Figure 10:
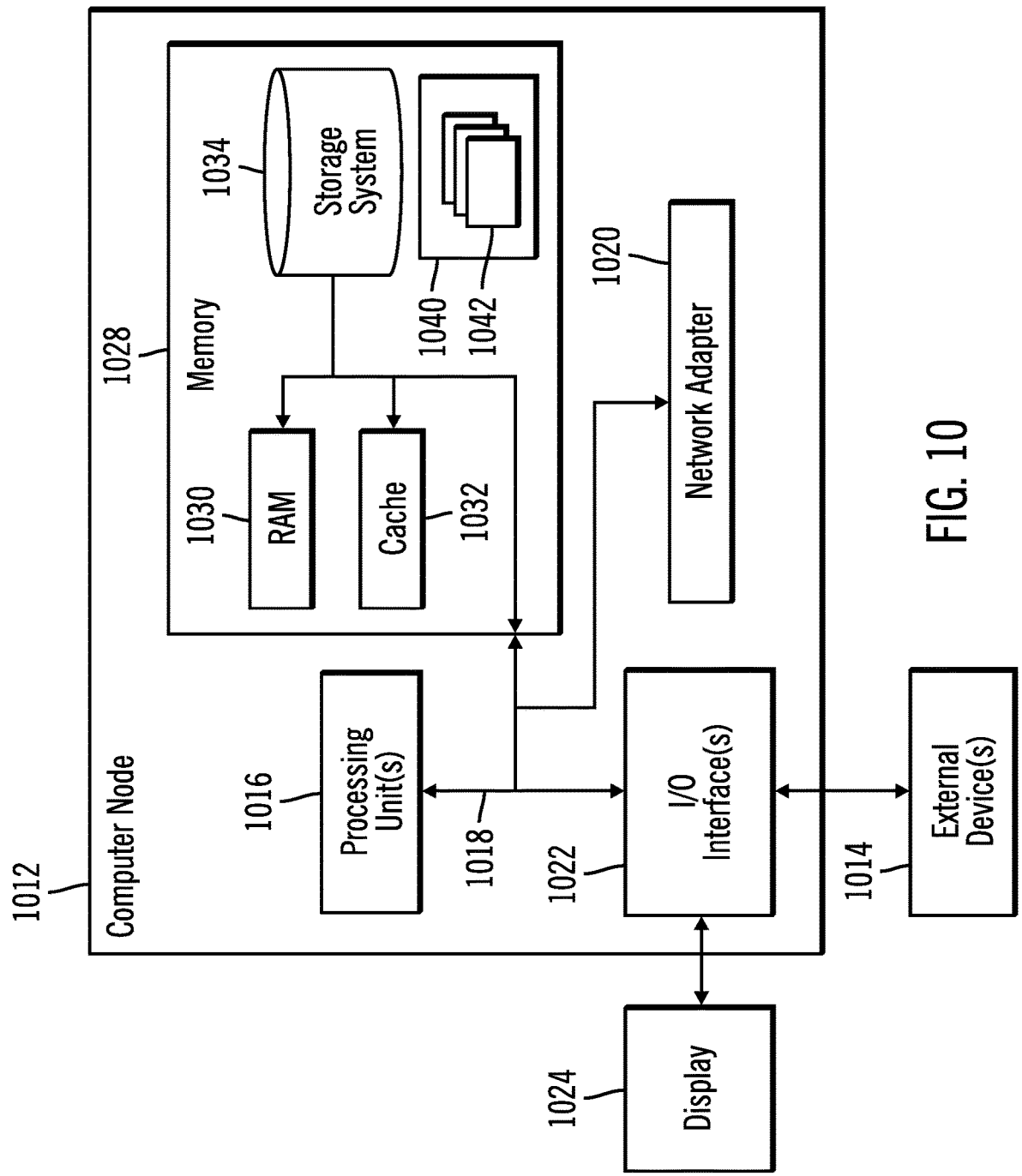
FIG. 10 illustrates a computing environment in accordance with certain embodiments.

FIG. 10 illustrates a computing environment in accordance with certain embodiments. Referring to FIG. 10, computer system 1012 is only one example of a suitable computing system and is not intended to suggest any limitation as to the scope of use or functionality of embodiments of the invention described herein. Regardless, computer system 1012 is capable of being implemented and/or performing any of the functionality set forth hereinabove.

The computer system 1012 may be a computer system, which is operational with numerous other general purpose or special purpose computing system environments or configurations. Examples of well-known computing systems, environments, and/or configurations that may be suitable for use with computer system 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 1012 may be described in the general context of computer system executable instructions, such as program modules, being executed by a computer system. Generally, program modules may include routines, programs, objects, components, logic, data structures, and so on that perform particular tasks or implement particular abstract data types. Computer system 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system 1012 is shown in the form of a general-purpose computing device. The components of computer system 1012 may include, but are not limited to, one or more processors or processing units 1016, a system memory 1028, and a bus 1018 that couples various system components including system memory 1028 to one or more processors or processing units 1016.

Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 1012 typically includes a variety of computer system readable media. Such media may be any available media that is accessible by computer system 1012, and it includes both volatile and non-volatile media, removable and non-removable media.

System memory 1028 can include computer system readable media in the form of volatile memory, such as random access memory (RAM) 1030 and/or cache memory 1032. Computer system 1012 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a compact disc read-only memory (CD-ROM), digital versatile disk read-only memory (DVD-ROM) or other optical media can be provided. In such instances, each can be connected to bus 1018 by one or more data media interfaces. As will be further depicted and described below, system memory 1028 may include at least one program product having a set (e.g., at least one) of program modules that are configured to carry out the functions of embodiments of the invention.

Program/utility 1040, having a set (at least one) of program modules 1042, may be stored in system memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer system 1012 may also communicate with one or more external devices 1014 such as a keyboard, a pointing device, a display 1024, etc.; one or more devices that enable a user to interact with computer system 1012; and/or any devices (e.g., network card, modem, etc.) that enable computer system 1012 to communicate with one or more other computing devices. Such communication can occur via Input/Output (I/O) interfaces 1022. Still yet, computer system 1012 can communicate with one or more networks such as a local area network (LAN), a general wide area network (WAN), and/or a public network (e.g., the Internet) via network adapter 1020. As depicted, network adapter 1020 communicates with the other components of computer system 1012 via bus 1018. It should be understood that although not shown, other hardware and/or software components could be used in conjunction with computer system 1012. Examples, include, but are not limited to: microcode, device drivers, redundant processing units, external disk drive arrays, Redundant Array of Inexpensive Disks (RAID) systems, tape drives, and data archival storage systems, etc.

In certain embodiments, the computing device 100 has the architecture of computer system 1012.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
   compiling source code by:
      for an unchanged function, making a copy of a relocatable debugging information entries table and a copy of a relocation information table;
      for a changed function, generating a new relocatable debugging information entries table and a new relocation information table, wherein the new relocatable debugging information entries table comprises a placeholder;
      merging the copy of the relocatable debugging information entries table and the new relocatable debugging information entries table to generate a merged relocatable debugging information entries table;
      merging the copy of the relocation information table and the new relocation information table to generate a merged relocation information table;
      resolving relocatable debugging information entries in the merged relocatable debugging information entries table according to information in the merged relocation information table to generate relocated Debugging with Attributed Record Formats information by resolving the placeholder according to the information in the merged relocation information table; and storing the relocated Debugging with Attributed Record Formats information in an object file that corresponds to the source code.

2. The computer-implemented method of claim 1, wherein the operations further comprise:
generating a relocatable debugging information entry with raw information, a name, a size, an offset, a parent index, and a sibling index.

3. The computer-implemented method of claim 1, wherein the operations further comprise:
generating a relocation information data structure with a source relocatable debugging information entry, a raw information offset, and a target relocatable debugging information entry.

4. The computer-implemented method of claim 1, wherein the operations further comprise:
obtaining an offset of a target relocatable debugging information entry; and
storing the offset into raw information of a source relocatable debugging information entry at a raw information offset.

5. The computer-implemented method of claim 1, wherein the Debugging with Attributed Record Formats information includes a debug section, and wherein the debug section includes one or more relocatable debugging information entries.

6. The computer-implemented method of claim 1, wherein the operations further comprise:
generating relocated Debugging with Attributed Record Formats information for a changed type.

7. A computer program product, the computer program product comprising a computer readable storage medium having program code embodied therewith, the program code executable by at least one processor to perform operations for:
compiling source code by:
for an unchanged function, making a copy of a relocatable debugging information entries table and a copy of a relocation information table;
for a changed function, generating a new relocatable debugging information entries table and a new relocation information table, wherein the new relocatable debugging information entries table comprises a placeholder;
merging the copy of the relocatable debugging information entries table and the new relocatable debugging information entries table to generate a merged relocatable debugging information entries table;
merging the copy of the relocation information table and the new relocation information table to generate a merged relocation information table;
resolving relocatable debugging information entries in the merged relocatable debugging information entries table according to information in the merged relocation information table to generate relocated Debugging with Attributed Record Formats information by resolving the placeholder according to the information in the merged relocation information table; and
storing the relocated Debugging with Attributed Record Formats information in an object file that corresponds to the source code.

8. The computer program product of claim 7, wherein the program code is executable by the at least one processor to perform operations for:
generating a relocatable debugging information entry with raw information, a name, a size, an offset, a parent index, and a sibling index.

9. The computer program product of claim 7, wherein the program code is executable by the at least one processor to perform operations for:
generating a relocation information data structure with a source relocatable debugging information entry, a raw information offset, and a target relocatable debugging information entry.

10. The computer program product of claim 7, wherein the program code is executable by the at least one processor to perform operations for:
obtaining an offset of a target relocatable debugging information entry; and
storing the offset into raw information of a source relocatable debugging information entry at a raw information offset.

11. The computer program product of claim 7, wherein the Debugging with Attributed Record Formats information includes a debug section, and wherein the debug section includes one or more relocatable debugging information entries.

12. The computer program product of claim 7, wherein the program code is executable by the at least one processor to perform operations for:
generating relocated Debugging with Attributed Record Formats information for a changed type.

13. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more computer-readable memories, to perform operations comprising:
compiling source code by:
for an unchanged function, making a copy of a relocatable debugging information entries table and a copy of a relocation information table;
for a changed function, generating a new relocatable debugging information entries table and a new relocation information table, wherein the new relocatable debugging information entries table comprises a placeholder;
merging the copy of the relocatable debugging information entries table and the new relocatable debugging information entries table to generate a merged relocatable debugging information entries table;
merging the copy of the relocation information table and the new relocation information table to generate a merged relocation information table;
resolving relocatable debugging information entries in the merged relocatable debugging information entries table according to information in the merged relocation information table to generate relocated Debugging with Attributed Record Formats information by resolving the placeholder according to the information in the merged relocation information table; and
storing the relocated Debugging with Attributed Record Formats information in an object file that corresponds to the source code.

14. The computer system of claim 13, wherein the operations further comprise:
    generating a relocatable debugging information entry with raw information, a name, a size, an offset, a parent index, and a sibling index.

15. The computer system of claim 13, wherein the operations further comprise:
    generating a relocation information data structure with a source relocatable debugging information entry, a raw information offset, and a target relocatable debugging information entry.

16. The computer system of claim 13, wherein the operations further comprise:
    obtaining an offset of a target relocatable debugging information entry; and
    storing the offset into raw information of a source relocatable debugging information entry at a raw information offset.

17. The computer system of claim 13, wherein the Debugging with Attributed Record Formats information includes a debug section, and wherein the debug section includes one or more relocatable debugging information entries.

18. The computer system of claim 13, wherein the operations further comprise:
    generating relocated Debugging with Attributed Record Formats information for a changed type.

* * * * *